United States Patent [19]

Shoup et al.

[11] 4,306,137
[45] Dec. 15, 1981

[54] METHOD AND APPARATUS FOR CONDUCTING SMUT-FREE STUD WELDING

[75] Inventors: Thomas E. Shoup; DuWayne L. Bertsch, both of Amherst, Ohio

[73] Assignee: TRW Inc., Cleveland, Ohio

[21] Appl. No.: 123,901

[22] Filed: Feb. 22, 1980

Related U.S. Application Data

[63] Continuation of Ser. No. 906,670, May 16, 1978, abandoned.

[51] Int. Cl.³ .............................................. B23K 9/20
[52] U.S. Cl. ...................................... 219/99; 219/98; 219/75; 219/121 PP
[58] Field of Search ................. 219/98, 99, 74, 137 R, 219/80, 127, 136, 121 PP, 121 PQ

[56] References Cited

U.S. PATENT DOCUMENTS

| | | | |
|---|---|---|---|
| 2,790,066 | 4/1957 | Haynes et al. | 219/74 |
| 3,096,429 | 7/1963 | Mowry et al. | 219/98 |
| 3,363,084 | 1/1968 | Busing | 219/99 |
| 3,495,066 | 2/1970 | Broyard et al. | 219/137 R |
| 3,676,640 | 7/1972 | Bernard et al. | 219/74 |
| 3,736,401 | 5/1973 | Shoup | 219/98 |
| 3,790,740 | 2/1974 | Shoup | 219/98 |
| 4,201,904 | 5/1980 | Weidman | 219/99 |

*Primary Examiner*—Thomas J. Kozma
*Assistant Examiner*—M. Paschall
*Attorney, Agent, or Firm*—Allen D. Gutchess, Jr.

[57] ABSTRACT

A method and apparatus for welding studs to a workpiece are provided. When the studs are welded to workpieces using a drawn-arc, stud welding technique, sometimes a coating of smut is deposited on the workpiece around the welded end of the stud. This coating detracts from the appearance of the stud and workpiece. Further, if the workpiece is to be covered with a coating material, the coating of smut must first be removed, resulting in an extra operation. It has been found that the coating of smut will not be deposited if, during the stud welding cycle, gas is directed toward the weld area in a swirling manner around the end of stud where the weld occurs.

3 Claims, 5 Drawing Figures

METHOD AND APPARATUS FOR CONDUCTING SMUT-FREE STUD WELDING

This is a continuation of application Ser. No. 906,670 filed May 16, 1978, now abandoned.

This invention relates to a method and apparatus for welding a stud to a workpiece without a coating of smut deposited thereon, by directing gas through a spark shield around the weld area.

The broad concept of supplying gas through a spark shield or ferrule around a stud to be welded to a workpiece is known in the art. This can be found in the following U.S. Pat. Nos.: 2,727,123; 2,790,066; 3,096,429; 3,363,084; 3,736,401; and 3,790,740. In the prior patents, the equipment has usually been used to apply an inert atmosphere around an aluminum stud during welding or to supply air around a stud to aid in welding through galvanized sheet steel.

When studs are welded to workpieces by a drawn-arc, stud welding technique, it is common for a coating of smut to be deposited on the workpiece around the welded end of the stud. For example, this usually occurs with trim studs which are welded to automobile bodies for the subsequent attachment of clips and trim strips. After the studs are welded and before the clips and trim are applied, the body receives a protective coating, such as a primer, and subsequent decorative coatings. If the coating of smut around the welded stud is not removed from the workpiece or automobile body, the protective coatings will not adhere properly and will separate from the surface.

A method and apparatus for welding studs to workpieces without coatings of smut being deposited on the workpieces have been discovered. In accordance with the invention, a spark shield is utilized around the stud and the chuck in which it is held, with the spark shield having a plurality of passages therein which are aligned with an area of the workpiece around the location where the stud is to be welded. A suitable gas, such as air, is directed through the passages toward the area during the welding cycle. The air then swirls around the area and does not impinge directly on the workpiece area aligned with the end of the stud and between which the pilot arc and a main welding arc are drawn. Also, if the air is directed at the workpiece at too sharp of an angle, turbulence will result. Direct impingement or turbulence will tend to extinguish the pilot arc and the main welding arc will not be imposed between the end of the stud and the workpiece. The end of the spark shield can also have a plurality of notches or passages through which small molten beads of weld metal, known as splatter, can escape.

It is, therefore, principal object of the invention to weld studs to workpieces without a coating of contaminants being deposited on the workpieces around the studs.

Another object of the invention is to provide a method and apparatus for welding studs to workpieces and to prevent a coating of smut from being deposited on the workpieces during the welding cycle.

A further object of the invention is to weld trim studs to automobile bodies and to subsequently coat the bodies with protective material without having to first remove coatings of smut around the studs.

Many other objects and advantages of the invention will be apparent from the following detailed discription of a preferred embodiment thereof, reference being made to the accompanying drawings, in which.

Figure 1:
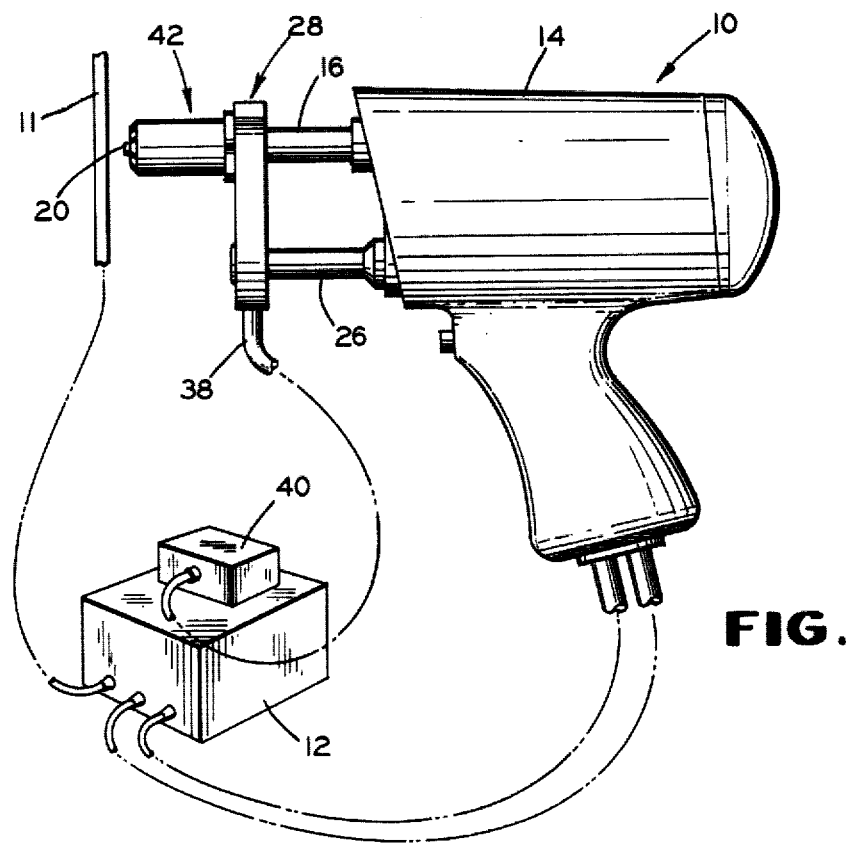
FIG. 1 is an overall view, partly in elevation and partly in perspective, of apparatus for welding studs in accordance with the invention.
Figure 2:
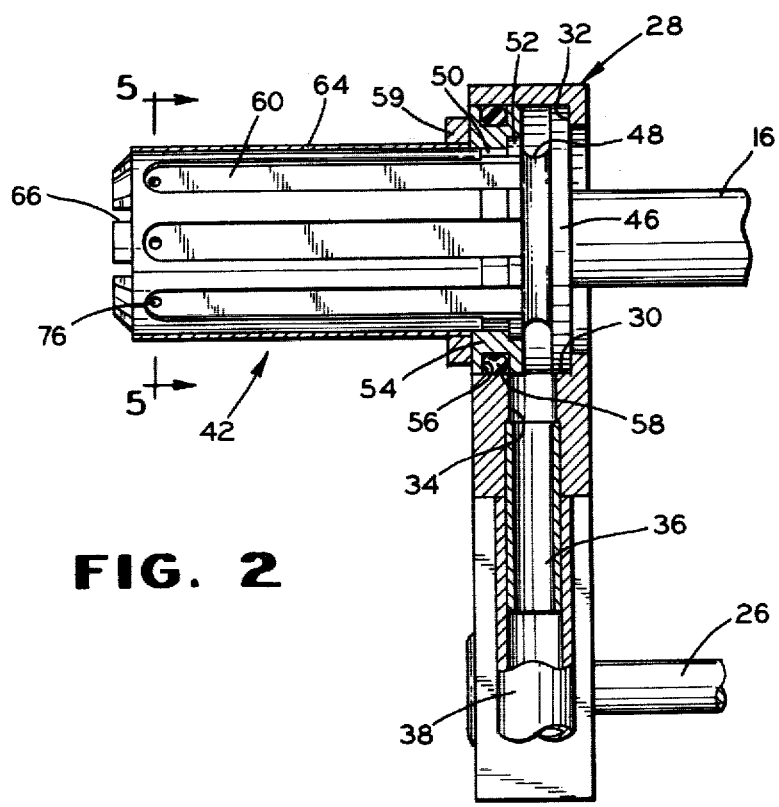
FIG. 2 is a greatly enlarged view in elevation, with parts in section, of a welding foot and spark shield of the apparatus of FIG. 1.

Referring to the drawings, and particularly to FIG. 1, a stud welding tool 10 according to the invention is used to weld a stud to a workpiece by means of a drawn-arc welding technique. The basic tool is known in the art and includes means for retracting stud from the workpiece, means for holding the stud in a retracted position for a predetermined period, and means for moving or plunging the stud toward and against the workpiece at the end of the predetermined period. As the stud is retracted from the workpiece, a pilot arc is drawn between the end of the stud and the workpiece and the main welding arc is subsequently imposed on the pilot arc, with the main welding arc then being maintained until the stud is plunged back against the workpiece. The tool can be of the type shown in U.S. Pat. No. 3,525,846, for example, and preferably utilizes a capacitive power source, as shown in U.S. Pat. No. 3,136,880, for example.

Figure 3:
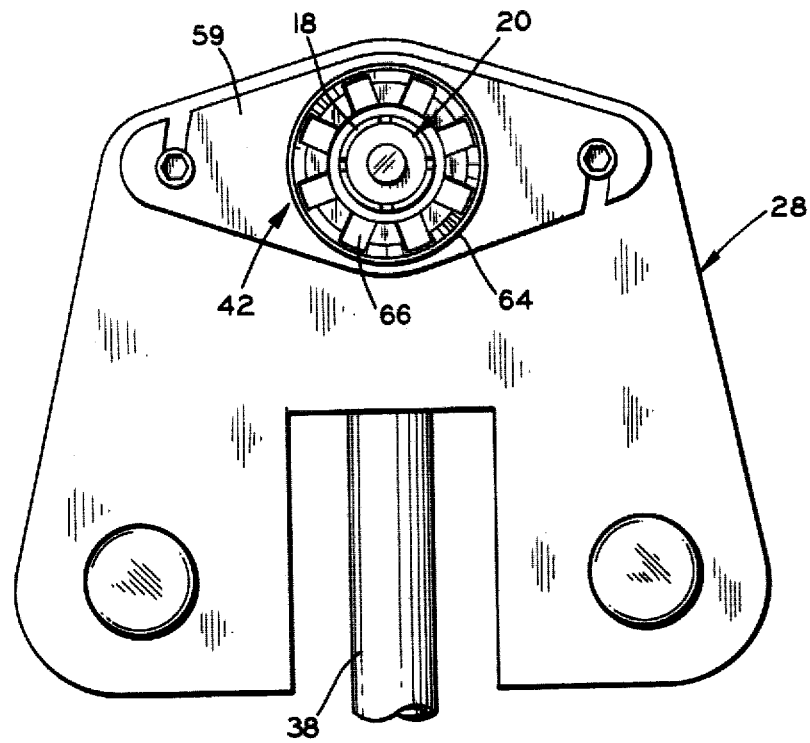
FIG. 3 is a front view in elevation of the welding foot and spark shield of FIG. 2.
Figure 4:
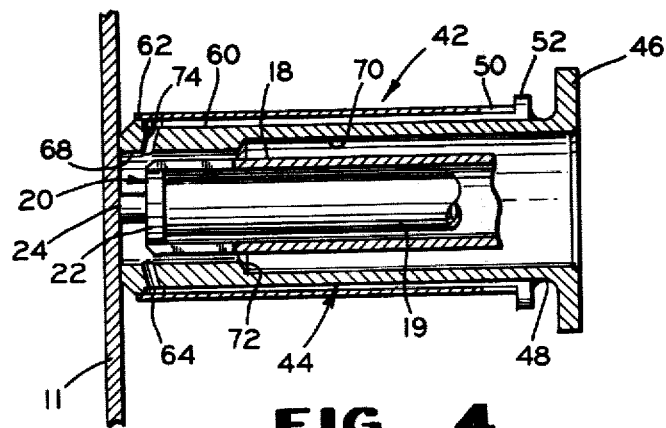
FIG. 4 is a fragmentary view of the spark shield and chuck taken generally along the line 4—4 FIG. 5.

A power and control unit 12 supplies power for the pilot and the main welding arcs and for a solenoid coil in a tool body 14, the coil retracting the stud against the force of a plunge spring when energized. A chuck leg 16 extends into the coil and also extends forwardly of the tool body 14 where it is suitably connected to a chuck 18 (FIGS. 3 and 4). In this instance, a trim stud 20 has a head 22 which is held by the chuck 18 and a stem 24 which extends forwardly, with the stud backed up by an adjustable stop 19 during the welding cycle. The studs can be fed into the front of the chuck by hand. They also can be transported by air through a tube from a remote supply source into a chamber in the chuck leg 16 behind the chuck 18. The studs can then be pushed into the chuck from the chamber by a plunger and backed up by the plunger during the welding cycle. The plunger can be connected to a piston in an air cylinder in the chuck leg to which air is supplied from a remote source. This type of loading arrangement is shown in U.S. Pat. Nos. 3,525,846 and 3,489,878 and does not constitute part of the instant invention.

A pair of supporting legs 26 extend forwardly of the tool body 14 and support a welding foot 28. The welding foot has an opening 30 around the chuck leg 16 with an inwardly-extending flange 32. An air supply passage 34 is formed in the foot and communicates with the opening 30. The foot has a fitting 36 connected with a tube 38 through which air is supplied from a control module 40 (FIG. 1). Clean shop air can be supplied to the module 40, with this air usually being at a pressure of about 80 psi. The module 40 has a valve which is controlled through the unit 12 and supplies air to the welding foot 28 during the weld cycle. The valve can have a time delay so as to keep the air on continuously unless no weld is made for a predetermined period of time, such as two seconds.

A spark shield 42 is located in the foot opening 30 and extends forwardly thereof. The spark shield 42 is positioned so that the stem 24 of the stud 20 protrudes slightly beyond the end of the spark shield, as shown in FIG. 1, before the stud is pressed against the workpiece. The shield 42 has a generally cylindrical body 44 with a rear flange 46 which abuts the flange 32 of the foot 28. An annular groove 48 is formed in the body 44 adjacent to the flange 46 and communicates with the air passage 34 in the foot 28. The body 44 has an outer cylindrical portion 50 and a shoulder 52 adjacent the annular groove 48, with a sealing ring 54 located on the outer cylindrical portion 50 adjacent the shoulder 52. The ring 54 has a annular groove 56 containing an O-ring 58 which seals off the spark shield 42 and the foot opening 30. A front plate 59 abuts the ring 50 to retain the spark shield 42 in the foot 28. A plurality of longitudinally-extending air passages 60 extend from the annular groove 48 past the shoulder 52 and the outer cylindrical portion 50 and terminate at a forward shoulder 62 at the forward end of the spark shield 42. The longitudinally-extending passages 60 are enclosed by a sleeve 64 which extends from the cylindrical portion 50 of the body 44 to the forward shoulder 62, being assembled with a force fit. At the forward end of the spark shield body 44 a plurality of rectangularly-shaped, radially-extending notches 66 are formed which communicate with the outer surface of the body 44 and with a forward, inner surface 68. The shield 42 preferably is made of copper and the surface 68 is highly polished to minimize the adherence of splatter thereto. A larger diameter inner surface 70 is located to the rear of the forward inner surface 68 and is offset by a shoulder 72.

A plurality of gas or air passages 74 are located in a forward end portion of the spark shield body 44. There is one of the passages 74 for each of the longitudinally-extending passages 60. Each of the passages 74 has an outer end 76 communicating with one of the passages 60 and an inner end 78 terminating at the inner surface 68 of the spark shield. The passages 74 are positioned so as to direct streams of gas or air toward the workpiece around the location at which the end of the stud stem 24 is to be welded. The streams of air thus apparently form a swirling action around the weld area, which action prevents the deposition of smut during the welding cycle. If the streams were directed directly at the location at which the stud is to be welded, the streams of air would extinguish the pilot arc and thus also prevent the main welding arc from being imposed thereon. This can also occur if the air is directed toward the workpiece at too sharp of an angle so as to become turbulent.

Figure 5:
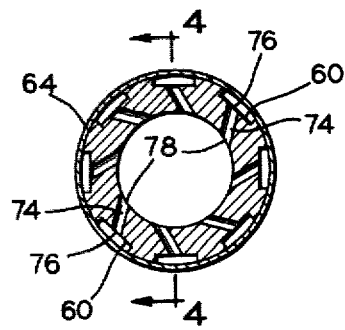
FIG. 5 is a view in transverse cross section taken generally along the line 5—5 of FIG. 2.

Each of the passages 74 is approximately tangential to the inner surface 68 of the spark shield and forms an angle of 25 to 35 degrees, and preferably 30 degrees, to a radius of the spark shield (FIG. 5). Each of the passages 74 also is located at an angle up to about 20 degrees, and preferably 18 degrees, to a plane perpendicular to the axis of the spark shield 42 or to the surface of the workpiece (FIG. 4). Air passages in the end of the spark shield in place of the notches, and forming a 0 degree angle with respect to the workpiece surface, have been found to be effective. The problem with this design is that the arc is blown out if the spark shield is tilted slightly. With the shop air at 80 psi, from 1 to 10 of the passages 74 are employed and preferably eight of them, with diameters from 0.020 to 0.060 in., and preferably 0.040 in. With the inner surface 68 having a diameter of 7/16 in., the inner ends 78 of the passages 74 terminate from 0.100 to 0.180 in., and preferably 0.125 in., from the forward end of the spark shield body 44. In any case, the position of the passages should be such that they direct the air streams beyond the end of the chuck 18, and at sufficiently narrow angles to the workpiece so as not to cause turbulence. Of course, it will be understood that the angles, lengths, and diameters of the air passages 74 will vary according to the stud size, spark shield size, and air pressure, by way of example. The important effect is to obtain a swirling, non-turbulent action around the weld area to prevent the deposition of smut without extinguishing the arcs.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. Apparatus for welding a trim stud to a vehicle body with the area of the vehicle body around the trim stud being maintained substantially free of smut, said apparatus comprising a welding tool having a chuck extending therefrom for holding the trim stud, means for establishing a welding arc between the stud and the vehicle body, and means for moving the stud toward and away from the vehicle body, a spark shield, a welding foot supporting one end portion of said spark shield in a position around said chuck with said spark shield having an inner surface spaced from said chuck and an outer surface, said spark shield having a plurality of fluid passages extending therethrough from the outer surface toward the inner surface and spaced uniformly around the periphery of said spark shield, said passages having diameters from 0.020 to 0.060 inch, said passages being positioned at common angles to radii of said spark shield as viewed in generally transverse cross section through said shield, and positioned at common angles to a plane perpendicular to the axis of said spark shield as viewed in generally longitudinal cross section through said shield, there being less than ten of said passages, and each of said passages having an opening at the inner end spaced closer to the end of said spark shield which is opposite said one end portion than an opening at the outer surface to direct fluid beyond the end of said chuck and toward the vehicle body, a plurality of radially-extending notches in the end of the spark shield opposite said one end portion, and a source of fluid under pressure communicating with the outer openings of said passages for supplying fluid through said passages and toward the area of the vehicle body around the trim stud during a welding operation.

2. In a method of welding a trim stud to a surface of a vehicle body with a surface of the vehicle body around the trim stud kept substantially free of smut, said method comprising holding a trim stud against a surface of a vehicle body, withdrawing the stud from the surface of the vehicle body, establishing a welding arc between the end of the trim stud and the surface of the vehicle body, moving the stud back toward the surface of the vehicle body, and directing a plurality of separate and distinct streams of fluid toward the surface of the vehicle body at angles to the surface of the vehicle body around but not at the location of the weld during the entire welding cycle to cause the streams to move in a slow swirling pattern around the weld location on the vehicle body.

3. Apparatus for welding a trim stud to a vehicle body with the weld area of the vehicle body around the welded stud being maintained substantially free of smut, said apparatus comprising a welding tool having a chuck extending therefrom, a welding foot, a spark shield having one end portion mounted in said welding foot, means extending from said tool and supporting said welding foot with an inner surface of said spark shield positioned around said chuck, a plurality of fluid passages formed in a second end portion of said spark shield and extending from an outer surface thereof toward the inner surface each of said passages having an opening at the inner end spaced closer to the end of said spark shield which is opposite said one end portion than an opening at the outer surface, said passages being positioned at common angles to radii of said spark shield, said passages being positioned at common angles to a plane perpendicular to the axis of said spark shield and being positioned to direct fluid through the inner openings beyond the end of said chuck and toward the area of the vehicle body around the stud, a plurality of notches in the end of said second portion of said spark shield, a sleeve positioned around said spark shield, and means for supplying fluid through said passages during a welding operation, said fluid supply means comprising passage means extending longitudinally of said spark shield and said sleeve, said longitudinal passage means being formed between the outer surface of said spark shield and an inner surface of said sleeve, said longitudinal passage means extending around the entire periphery of the spark shield and communicating with the fluid passages at the outer surface of said spark shield, and an additional passage formed in said welding foot and communicating with said longitudinal passage means.

* * * * *